(12) United States Patent
Kwon et al.

(10) Patent No.: US 9,048,933 B2
(45) Date of Patent: Jun. 2, 2015

(54) RADIO-FREQUENCY TRANSCEIVING FRONT-END APPARATUS USING PASSIVE ELEMENTS IN WIRELESS COMMUNICATION SYSTEM

(75) Inventors: Heon Kook Kwon, Daejeon (KR); Myung Don Kim, Daejeon (KR); Jae Joon Park, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 13/619,967

(22) Filed: Sep. 14, 2012

(65) Prior Publication Data

US 2013/0163488 A1 Jun. 27, 2013

(30) Foreign Application Priority Data

Dec. 26, 2011 (KR) ........................ 10-2011-0142699

(51) Int. Cl.
*H04L 5/00* (2006.01)
*H04J 1/00* (2006.01)
*H04J 3/00* (2006.01)
*H04B 1/58* (2006.01)

(52) U.S. Cl.
CPC . *H04B 1/525* (2013.01); *H04B 1/58* (2013.01)

(58) Field of Classification Search
None
See application file for complete search history.

(56) References Cited

U.S. PATENT DOCUMENTS

| | | | |
|---|---|---|---|
| 5,815,803 A * | 9/1998 | Ho et al. | 455/78 |
| 7,446,630 B2 * | 11/2008 | Chan et al. | 333/138 |
| 7,948,924 B2 | 5/2011 | Seo | |
| 8,749,321 B2 * | 6/2014 | Kim et al. | 333/202 |
| 2006/0087385 A1 * | 4/2006 | Fitzpatrick et al. | 333/117 |
| 2006/0105733 A1 * | 5/2006 | Singh et al. | 455/304 |
| 2007/0013575 A1 * | 1/2007 | Lee et al. | 342/52 |
| 2009/0069053 A1 * | 3/2009 | Kim et al. | 455/561 |
| 2009/0108954 A1 * | 4/2009 | Cheung et al. | 333/1.1 |
| 2009/0190509 A1 * | 7/2009 | Yoon | 370/280 |
| 2009/0268642 A1 * | 10/2009 | Knox | 370/277 |
| 2011/0026442 A1 * | 2/2011 | Yoon | 370/278 |
| 2011/0032854 A1 * | 2/2011 | Carney et al. | 370/294 |
| 2011/0069644 A1 * | 3/2011 | Kim et al. | 370/278 |
| 2011/0105060 A1 * | 5/2011 | Kim et al. | 455/127.1 |
| 2011/0140803 A1 * | 6/2011 | Kim et al. | 333/110 |

FOREIGN PATENT DOCUMENTS

KR 10-0706575 4/2007
KR 10-0951089 4/2010

* cited by examiner

*Primary Examiner* — Candal Elepenord
(74) *Attorney, Agent, or Firm* — Nelson Mullins Riley & Scarborough LLP; Anthony A. Laurentano, Esq.

(57) ABSTRACT

Disclosed is a radio-frequency front-end apparatus that can be used in wireless communication systems performing transmission/reception by using a single antenna. The radio-frequency transceiving front-end apparatus using passive elements in a wireless communication system includes: a transmitting unit's hybrid coupler configured to divide and output a transmission signal into two outputs having a phase difference of 90°; a first circulator configured to receive a first output of the hybrid coupler through a first terminal thereof and output the received first output through a second terminal thereof; a second circulator configured to receive a second output of the hybrid coupler through a first terminal thereof and output the received second output through a second terminal thereof; and an output unit's hybrid coupler configured to receive transmission signals from the second terminal of the first circulator and the second terminal of the second circulator, and combine and output the received signals.

11 Claims, 5 Drawing Sheets

RADIO-FREQUENCY TRANSCEIVING FRONT-END APPARATUS USING PASSIVE ELEMENTS IN WIRELESS COMMUNICATION SYSTEM

CROSS-REFERENCE TO RELATED APPLICATIONS

This application is based on and claims priority from Korean Patent Application No. 10-2011-0142699, filed on Dec. 26, 2011 with the Korean Intellectual Property Office, the disclosure of which is incorporated herein in its entirety by reference.

TECHNICAL FIELD

The present disclosure relates to a radio-frequency front-end apparatus that can be used in a wireless communication system performing transmission/reception by using a single antenna, and more particularly, to a radio-frequency transceiving front-end apparatus using passive elements in wireless communication systems that can implement characteristics of high power, low loss, and high isolation between transmission and reception at low cost by using radio-frequency passive elements.

BACKGROUND

The structure of a front end of a system required to commonly use a single antenna in transmission/reception is diversified with the development of wireless communication systems. For example, a structure capable of supporting both transmission/reception combination schemes through a frequency division demultiplexing (FDD) and a time division demultiplexing (TDD) is required and a structure in which a communication (for example, an inter-matter communication, M2M) between FDD systems having the same transmission/reception frequencies is supported is also required. In this case, the isolation between transmission/reception also needs to be significantly ensured.

Meanwhile, a front end of the wireless communication system, which is connected with an antenna transfers a high-power transmission signal generated in the system to the antenna and transfers a reception signal received from the antenna through a reception route, and in this case, it is important to reduce loss as possible. The front end is basically required to be configured by an element suitable for high power in order to process a high-power transmission signal.

In order to commonly use the single antenna in transmission/reception, the front end of the wireless communication system uses the time division demultiplexing (TDD) scheme and the frequency division demultiplexing (FDD) scheme. In this case, the former, which is a scheme using the same frequency in transmission and reception, and alternately operating by temporally dividing transmission/reception to use the single antenna, switches a transmission mode and a reception mode using a switch. In the latter, as transmission and reception are temporally simultaneously performed by differentiating transmission and reception frequencies, the transmission signal and the reception signal are combined by a single port while the transmission signal and the reception signal are divided and isolated by different filters.

In FIG. 1A, transmission/reception signals having the same carrier frequency are temporally divided to be connected with the antenna by using a switch in order to combine transmission and reception in the TDD scheme. That is, a transmission signal Tx is input into a switch 103 through a first band pass filter (hereinafter, a 'BPF') 101 and transmitted to a wireless space through an antenna 104 as the switch is switched to the transmission mode.

On the contrary, a reception signal Rx received through the antenna 104 is input into a second BPF 102 as the switch 103 is switched to the reception mode, and received while being band-pass filtered in a corresponding band by the second BPF 102.

In FIG. 1B, a duplexer is used to combine transmission and reception in the FDD scheme. The duplexer divides and combines the transmission and reception signals having different carrier frequencies by using a filter 105 and is connected to the antenna 106 temporally simultaneously.

In the TDD scheme, as a structure in which the transmission mode and the reception mode are divided by the switch, various transmission/reception frequencies can be configured according to a configuration of the filter on transmission/reception route. This is the structure in which the communication (for example, the inter-matter communication, M2M) between the systems having the same transmission/reception frequencies is possible, but the communication is possible only in the TDD scheme and impossible in the FDD scheme in which transmission and reception operate simultaneously. A high-cost and high-power switch is required for high-power transmission.

FIG. 2 is a transmission/reception system using a single circulator 203. In FIG. 2, transmission is connected toward the antenna and reception is continuously connected to a reception route in the antenna by directionality of a signal regardless of the carrier frequencies of transmission and reception in FIG. 1 to support both the TDD and FDD schemes.

That is, the transmission/reception system of FIG. 2 uses a characteristic of a circulator of which an advance direction is determined according to the directionality of the signal. The transmission/reception system is configured such that the transmission signal is transferred to an antenna 204 through a first BPF 201 and the circulator 203 and the signal received by the antenna 204 is received through the circulator 203 and a second BPF 202. Therefore, the transmission and reception routes may be combined regardless of the frequency.

Various transmission/reception frequencies can be configured according to the configuration of the filter on the transmission and reception route, the communication (for example, the inter-matter communication, M2M) between the systems having the same transmission/reception frequencies can also be supported in both the TDD/FDD schemes, and the front-end is constituted by low-priced passive elements even in high-power transmission.

However, in the radio-frequency front end using the circulator, isolation between transmission and reception is determined by isolation of the circulator and the radio-frequency front end shows somewhat small isolation which is approximately 25 dB. Therefore, the high-power transmission influences the transmission route to influence the performance of the receiver.

SUMMARY

The present disclosure has been made in an effort to provide a radio-frequency transceiving front-end apparatus using a passive element in wireless communication systems that configures a radio-frequency transmission/reception combination front end that supports both TDD and FDD by combining a 90° hybrid coupler having an output of a 90° phase difference to a circulator structure that supports both the TDD and the FDD, and supports all of various required functions with the development of wireless communication technology through a single front end.

The present disclosure also has been made in an effort to provide a radio-frequency front-end apparatus using passive elements in wireless communication systems that can support both TDD and FDD at high power, low loss, and low cost and support both TDD and FDD schemes in an inter-system communication having the same transmission/reception frequencies.

The present disclosure also has been made in an effort to provide a radio-frequency transceiving front-end apparatus using a passive element in a wireless communication system that can be applied to a low-cost, low-loss, and high-power transmission and wireless communication system by using radio-frequency passive elements and prevent high-power transmission from influencing a reception route by further increasing isolation between transmission and reception.

An exemplary embodiment of the present disclosure provides a radio-frequency transceiving front-end apparatus using passive elements in wireless communication systems including: a transmitting unit's hybrid coupler configured to divide and output a transmission signal into two outputs having a phase difference of 90°; a first circulator configured to receive a first output of the hybrid coupler through a first terminal thereof and output the received first output through a second terminal thereof; a second circulator configured to receive a second output of the hybrid coupler through a first terminal thereof and output the received second output through a second terminal thereof; and an output unit's hybrid coupler configured to receive transmission signals from the second terminal of the first circulator and the second terminal of the second circulator, and combine and output the received signals.

Effects of the present disclosure are as follows.

In the wireless communication systems, both the transmission and reception combination schemes are supported through the TDD and the FDD in commonly using the single antenna, a function of supporting the communication (for example, the inter-matter communication, M2M) between FDD systems having the same transmission/reception frequencies is required, and performance associated with high isolation between transmission and reception, high power, and low loss is also required.

According to the configuration of the present disclosure, the radio-frequency front end for commonly using the single antenna is constituted by low-loss passive elements in the wireless communication systems to achieve low-loss transmission and reception combination, which may be suitable for high power and acquire high isolation between transmission and reception. The radio-frequency front end supports both the TDD and FDD schemes and enables the communication between the FDD systems having the same transmission and reception frequencies.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

In the present disclosure, transmission and reception are combined while low loss is maintained by combining a 90° hybrid coupler having an output of a phase difference of 90° to a circulator, thus solving problems in the related art. A low-cost and high-power front end may be configured by using radio-frequency passive elements.

Figure 1A:
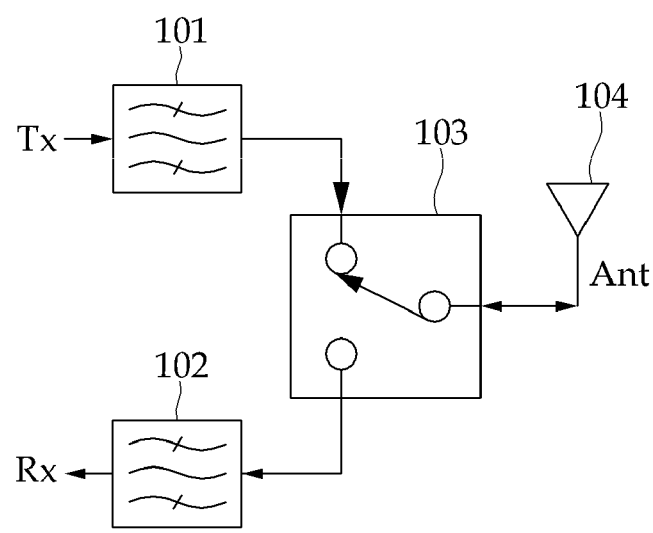
FIG. 1A is a diagram illustrating a front end of a general TDD wireless communication system.
Figure 1B:
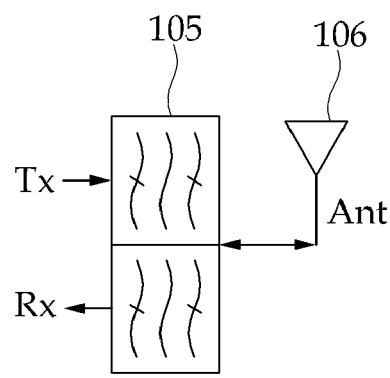
FIG. 1B is a diagram illustrating a front end of a general FDD wireless communication system.
Figure 2:
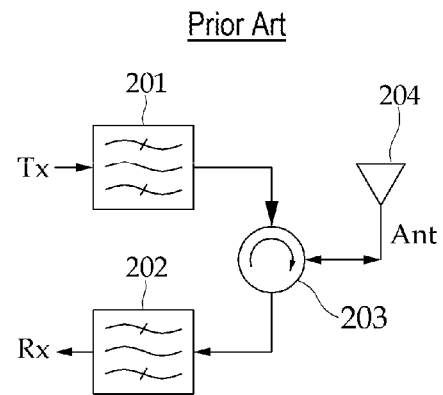
FIG. 2 is a diagram illustrating a front end of a wireless communication system in which both TDD and FDD are possible.
Figure 3:
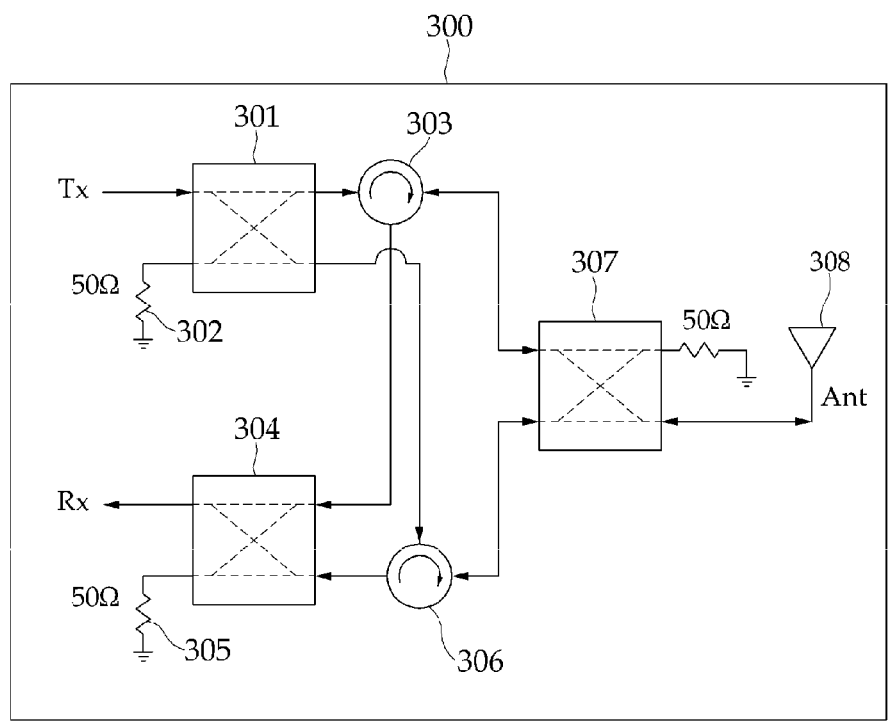
FIG. 3 is a diagram illustrating the structure of a front end in a wireless communication system according to an exemplary embodiment of the present disclosure.

Accordingly, in the present disclosure, a single antenna is commonly used, and a radio-frequency front end according to the exemplary embodiment of the present disclosure may be constituted by only radio-frequency passive elements without an active element as illustrated in FIG. 3.

Referring to FIG. 3, a transmission signal is divided into two outputs having a phase difference of 90° through a 90° hybrid coupler 301 of a transmitting unit and transferred to circulators 303 and 306, respectively. In this case, the two transmission signals divided by directionality of the circulators are transferred to the 90° hybrid coupler 307 of a final stage, and coupled and output to an antenna 308 port through the hybrid coupler 307. As loss generated at that time, a low-loss characteristic within 1 dB may be acquired due to low-loss characteristics of the coupler 307, and the circulators 303 and 304.

Meanwhile, a reception signal received through the antenna 308 is transferred through the 90° hybrid coupler 307 similarly as the transmission signal, and the transferred reception signal is divided into two outputs having a phase difference of 90° and transferred to the circulators 303 and 306, respectively. In this case, after the two reception signals divided by the directionality of the circulators are transferred to two input terminals of a 90° hybrid coupler 304 of a receiving unit, the reception signals are coupled by the coupler and finally transferred to a reception route.

Figure 4:
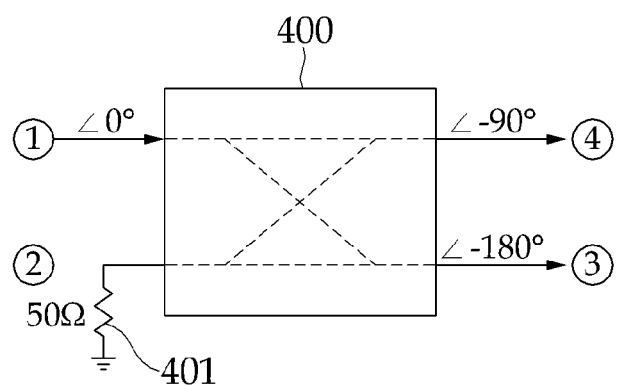
FIG. 4 is a diagram illustrating an input/output phase change of a 90° hybrid coupler applied to the present disclosure.

FIG. 4 is a diagram illustrating the hybrid coupler of FIG. 3. As illustrated in FIG. 4, a 90 hybrid coupler 400 is a radio-frequency passive element that changes phases of an input and an output.

That is, a signal input into a terminal #1 is applied through the 90° hybrid coupler 400 and divided into a terminal #3 and a terminal #4 with ½ of power, and distributed and output into two signals having phases of −180° and −90°. Signals having a phase difference of 180° are distributed to a 50Ω termination resistor 401 and are removed. Even though inputs and outputs of the respective signals are changed, a phase difference of the same relationship occurs in the operation.

That is, when the signal is input into the terminal #3, a signal having a phase difference of −90° is output to the terminal #2 and a signal having a phase difference of −180° is output to the terminal #1, and when the signal is input into the terminal #4, the signal having the phase difference of −90° is output to the terminal #1 and the signal having the phase difference of −180° is output to the terminal #2.

Figure 5A:
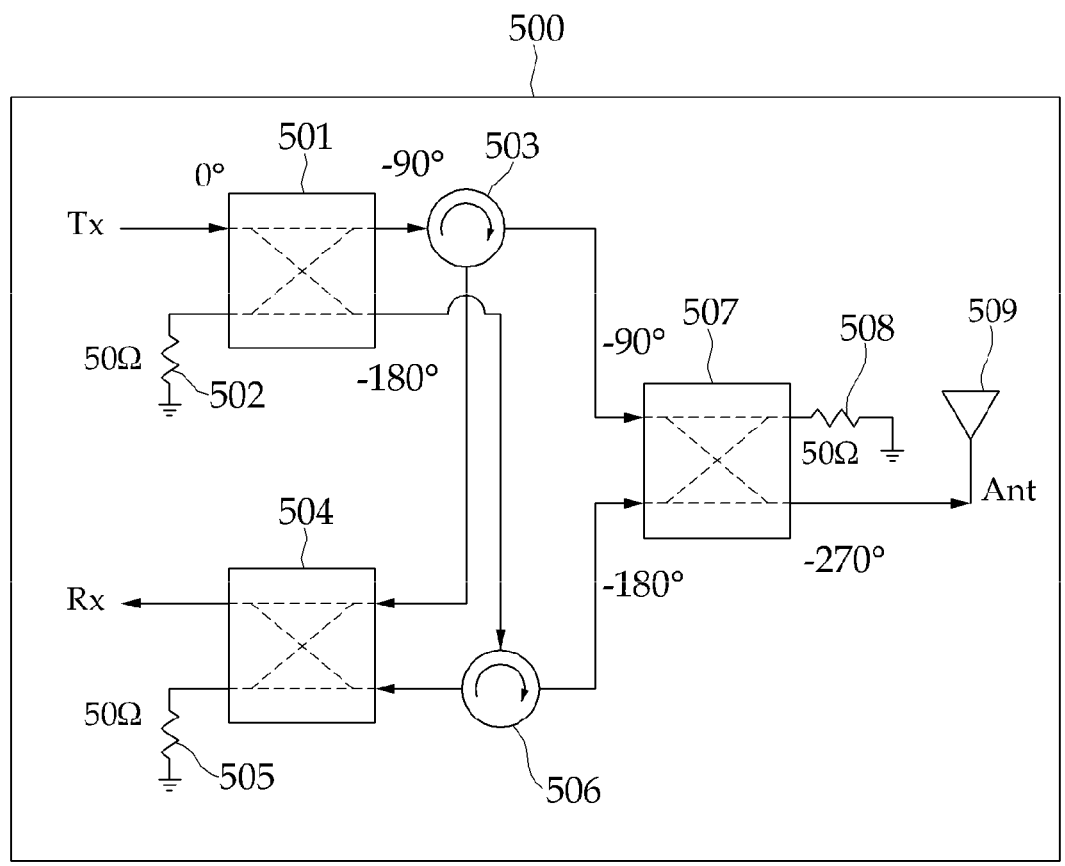
FIG. 5A is a diagram illustrating a transferring process of a transmission signal according to the exemplary embodiment of the present disclosure.

FIG. 5A illustrates a process in which the transmission signal is transferred to an antenna from the radio-frequency transceiving front-end apparatus according to the exemplary embodiment of the present disclosure.

That is, the transmission signal Tx is applied through a 90° hybrid coupler 501 of the transmitting unit and divided to have ½ of power, and distributed and output into two signals having phases of −90° and −180°. Signals having a phase difference of 180° are distributed to a 50Ω termination resistor 502 and are removed. The respective distributed and output signals are input into independent circulators 503 and 506, respectively and thus transferred to different inputs of a 90° hybrid coupler 507 of an output unit according to directionality of the circulators. A transmission signal having a phase of −90° between the signals transferred from two circulators is transferred to the antenna with a phase of −270° through a route that causes a phase change of −180° among routes of the 90° hybrid coupler 507 of the output unit and the other transmission signal having a phase of −180° is transferred to the antenna with the phase of −270° through a route that causes a phase change of −90° among the routes of the 90° hybrid coupler 507 of the output unit, and as a result, the two signals are combined with the same phase of −270° and output to an antenna 509.

The two signals are transferred to another output unit of the 90° hybrid coupler 507 of the output unit, and in this case, between the two signals, the signal having the phase of −90° is converted into the phase of −180° through the route of −90° and the signal having the phase of −180° is converted into a phase of 0° through a route of −180°, and thus the signals are removed.

Figure 5B:
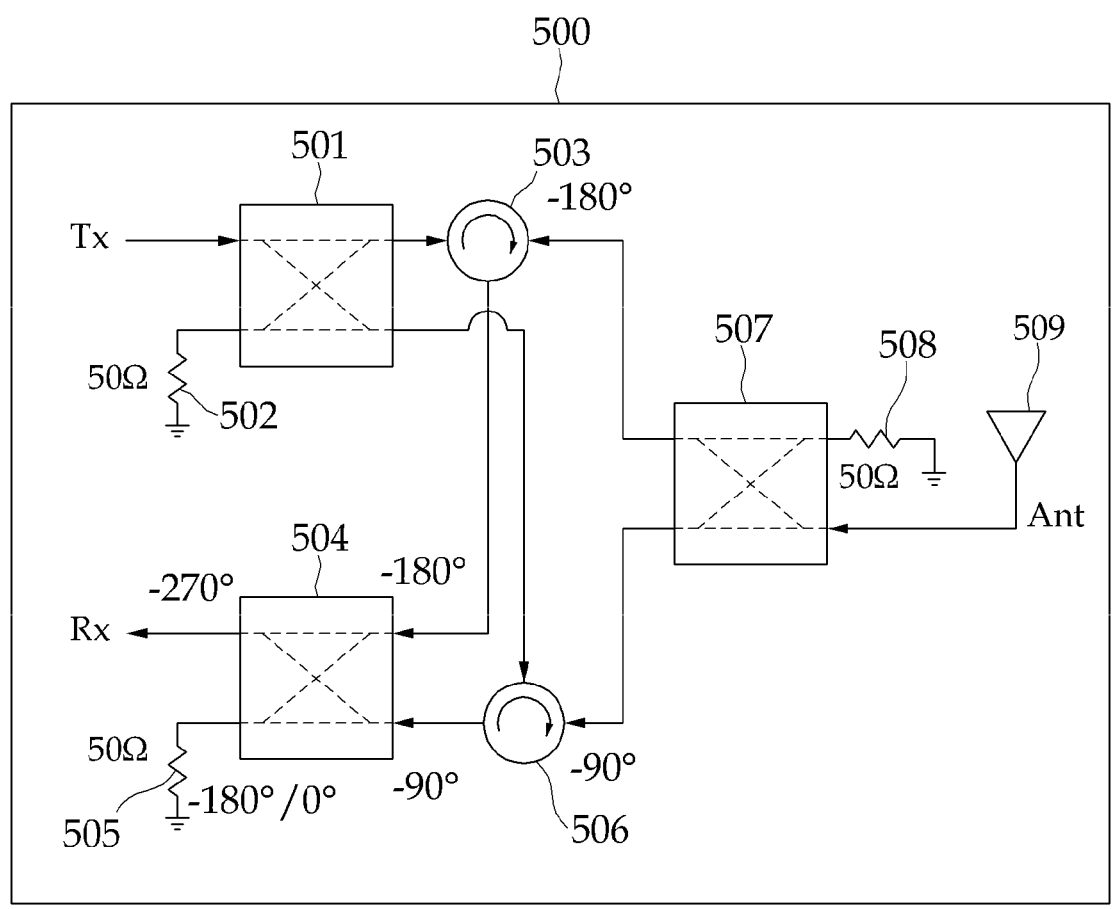
FIG. 5B is a diagram illustrating a transferring process of a reception signal according to the exemplary embodiment of the present disclosure.

FIG. 5B is a diagram illustrating a process in which the reception signal received by the antenna is transferred to a receiver in the radio-frequency transceiving front-end apparatus according to the exemplary embodiment of the present disclosure.

The reception signal received through the antenna 509 is transferred to the 90° hybrid coupler 507 of the output unit and the transferred signal is divided to have ½ of power by the 90° hybrid coupler 507, and distributed and output into two signals having phases of −90° and −180°, respectively. Signals having a phase difference of 180° are distributed to a 50Ω termination resistor 508 and are removed. The respective distributed and output signals are input into the independent circulators 503 and 506, respectively and thus transferred to different inputs of 90° hybrid couplers 501 and 504 of a receiving unit according to directionality of the circulators.

A reception signal having a phase of −90° between the signals transferred from two circulators 503 and 506 is transferred to the receiver with the phase of −270° through a route that causes a phase change of −180° among routes of the 90° hybrid coupler 501 of the receiving unit and the other reception signal having a phase of −180° is transferred to the receiver with the phase of −270° through a route that causes a phase change of −90° among the routes of the 90° hybrid coupler of the receiving unit, and as a result, the two signals are combined to have the same phase of −270° and output to the receiver.

The two signals are transferred to another output unit of the 90° hybrid coupler of the receiving unit, and in this case, between the two signals, the signal having the phase of −90° is converted into a phase of −180° through the route of −90° and the signal having the phase of −180° is converted into the phase of 0° through the route of −180°, and thus the signals are removed.

As described above, the front end according to the present disclosure is constituted by using the 90° hybrid couplers and the circulators which are the low-loss passive elements in transmission and reception, and insertion loss may be implemented within 1 dB.

Figure 5C:
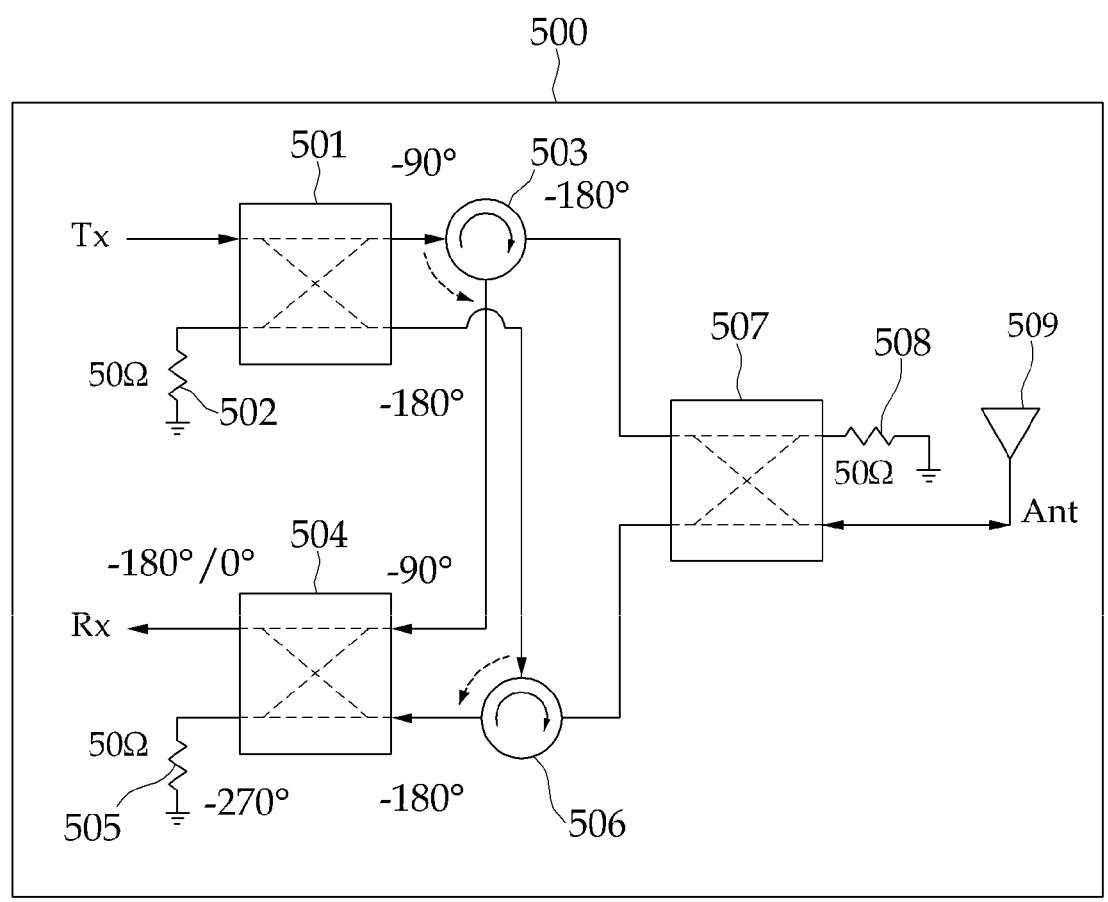
FIG. 5C is a diagram illustrating isolation of the transmission signal from the reception signal according to the exemplary embodiment of the present disclosure.

FIG. 5C is a diagram illustrating a process in which the transmission signal is transferred to the receiving unit in the radio-frequency transceiving front-end apparatus according to the exemplary embodiment of the present disclosure.

The transmission signal is divided into ½ of power through the 90° hybrid couplers 501 and 504 of the transmitting unit and distributed into two signals having the phases of −90° and −180°, respectively. The distributed signals are input into the independent circulators 503 and 506, respectively and transferred to different inputs of the 90° hybrid coupler 507 of the output unit according to the directionality of the circulator, but some transmission signals actually leak to the other terminal of the circulator by isolation of the circulator. A transmission signal having the phase of −90° between the signals that leak from two circulators is transferred to the receiver with the phase of −180° through a route that causes the phase change of −90° among routes of the 90° hybrid coupler 507 of the receiving unit and the other transmission signal having the phase of −180° is transferred to the receiver with the phase of 0° through a route that causes a phase change of −180° among the routes of the 90° hybrid coupler 507 of the receiving unit, and as a result, two signals are removed.

As described above, in the case of the isolation of transmission and reception of the present disclosure, the isolations of the 90° hybrid couplers 501, 504, and 507 are directly added to the isolation of the circulators 503 and 506, and as a result, the isolation of transmission and reception can be further improved.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A radio-frequency (RF) transceiving front-end apparatus using passive elements in wireless communication systems, comprising:
    a transmitting unit's hybrid coupler configured to divide and output a transmission signal into two outputs having a phase difference of 90°;
    a first circulator configured to receive a first output of the hybrid coupler through a first terminal thereof and output the received first output through a second terminal thereof;
    a second circulator configured to receive a second output of the hybrid coupler through the first terminal thereof and output the received second output through the second terminal thereof;

a receiving unit's hybrid coupler configured to receive reception signals from the first circulator and the second circulator and combine and output the reception signals; and an output unit's hybrid coupler configured to receive transmission signals from the second terminal of the first circulator and the second terminal of the second circulator, and combine and output the received signals.

2. The apparatus of claim 1, wherein a termination resistor is connected to one terminal of four terminals of the transmitting unit's hybrid coupler.

3. The apparatus of claim 1, wherein the termination resistor is connected to one terminal of four terminals of the output unit's hybrid coupler.

4. The apparatus of claim 1, wherein the termination resistor is connected to one of four terminals of the receiving unit's hybrid coupler.

5. The apparatus of claim 1, wherein the first circulator receives the reception signal from the output unit's hybrid coupler through the second terminal thereof and provides the received reception signal to the receiving unit's hybrid coupler through the third terminal thereof.

6. The apparatus of claim 1, wherein the second circulator receives the reception signal from the output unit's hybrid coupler through the second terminal thereof and provides the input reception signal to the receiving unit's hybrid coupler through the third terminal thereof.

7. The apparatus of claim 1, wherein the transmitting unit's hybrid coupler is a 90° hybrid coupler.

8. The apparatus of claim 1, wherein the output unit's hybrid coupler is the 90° hybrid coupler.

9. The apparatus of claim 1, wherein the receiving unit's hybrid coupler is the 90° hybrid coupler.

10. The apparatus of claim 1, wherein the transmitting unit's hybrid coupler outputs output signals which are signals having phases of −90° and −180°, respectively.

11. A radio-frequency (RF) transceiving front-end apparatus using passive elements in wireless communication systems, comprising:

a transmitting unit's hybrid coupler configured to divide and output a transmission signal into two outputs having a phase of −90° and −180°;

a first circulator configured to receive a first output of the hybrid coupler through a first terminal thereof and output the received first output through a second terminal thereof;

a second circulator configured to receive a second output of the hybrid coupler through the first terminal thereof and output the received second output through the second terminal thereof;

a receiving unit's hybrid coupler configured to receive reception signals from the first circulator and the second circulator and combine and output the reception signals; and an output unit's hybrid coupler configured to receive transmission signals from the second terminal of the first circulator and the second terminal of the second circulator, and combine and output the received signals, wherein the first output has the phase of −90° and the second output has the phase of −180°.

* * * * *